(12) United States Patent
Strange et al.

(10) Patent No.: US 11,781,579 B1
(45) Date of Patent: Oct. 10, 2023

(54) BLIND BOLT WITH COLLAPSIBLE SHEAR SLEEVE ASSEMBLY

(71) Applicant: Allfasteners USA, LLC, Medina, OH (US)

(72) Inventors: Michael Strange, Columbia Station, OH (US); Bruce A. Carmichael, Hinckley, OH (US)

(73) Assignee: Allfasteners USA, LLC, Medina, OH (US)

( * ) Notice: Subject to any disclaimer, the term of this patent is extended or adjusted under 35 U.S.C. 154(b) by 351 days.

(21) Appl. No.: 16/668,651

(22) Filed: Oct. 30, 2019

Related U.S. Application Data

(60) Provisional application No. 62/853,277, filed on May 28, 2019.

(51) Int. Cl.
  *F16B 19/02* (2006.01)
  *F16B 13/06* (2006.01)

(52) U.S. Cl.
  CPC ................ *F16B 13/063* (2013.01);
  *F16B 19/02* (2013.01)

(58) Field of Classification Search
  CPC ..... F16B 5/0258; F16B 10/0808; F16B 19/02; F16F 2234/02; F16F 1/025; F16F 1/028; F16B 13/0808
  USPC ................................................. 411/456, 544
  See application file for complete search history.

(56) References Cited

U.S. PATENT DOCUMENTS

| | | | |
|---|---|---|---|
| 1,062,015 A | 5/1913 | Lane | |
| 1,703,232 A | 2/1929 | Gray et al. | |
| 1,838,134 A | 12/1931 | Cozzens | |
| 2,511,051 A | 6/1950 | Dzus | |
| 2,632,354 A | 3/1953 | Black | |
| 2,746,022 A | 5/1956 | Gilbert | |
| 2,761,108 A | 8/1956 | Jackson et al. | |
| 3,129,630 A | 4/1964 | Wing et al. | |
| 3,400,627 A | 9/1968 | Raynovich, Jr. | |
| 3,594,876 A | 7/1971 | Gunther | |
| 3,789,705 A | 2/1974 | Naslund | |

(Continued)

OTHER PUBLICATIONS

Ajax Bolt drawing with neoprene washer dated Dec. 2013.
AllFasteners Newsletter ad dated Oct. 2014 showing bolt with rubber gasket.

(Continued)

*Primary Examiner* — Flemming Saether
(74) *Attorney, Agent, or Firm* — Luedeka Neely Group, P.C.

(57) ABSTRACT

A blind bolt extends through a hole which extends through a first and second member. An anchor is disposed on the distal end of a blind bolt shaft, and the anchor has expanded and contracted configurations. An anchor is disposed on the distal end on a shaft and is positioned beyond the distal end of the hole engaging a surface of the second member thereby holding the shaft in the hole. A shear sleeve is disposed on the blind bolt proximate to the distal end of the shaft and has a length sufficient to extend across the second member, across the interface between the first and second members and partially across the first member. A nut is threaded on the threads of the shaft, and a collapsible cylinder is disposed on the blind bolt shaft between the sheer sleeve and nut. The collapsible cylinder and the sheer sleeve have a combined length such that when the anchor is in the expanded configuration and the sheer sleeve and the collapsible cylinder are positioned on the shaft within the hole, the collapsible cylinder pushes the sheer sleeve to a position extending across the interface between the first and second members as the nut is tightened on the shaft. The collapsible cylinder may be a deformable crushable sleeve or a telescoping sleeve.

11 Claims, 5 Drawing Sheets

(56) References Cited

U.S. PATENT DOCUMENTS

| | | | |
|---|---|---|---|
| 4,022,099 A | | 5/1977 | Ballantyne |
| 4,194,858 A | | 3/1980 | Evans |
| 4,293,259 A | | 10/1981 | Liebig |
| 4,315,708 A | | 2/1982 | Liebig |
| 4,613,264 A | | 9/1986 | McIntyre et al. |
| 4,637,764 A | | 1/1987 | Imai |
| 4,790,700 A | * | 12/1988 | Schwartzman ...... B23B 31/207 |
| | | | 267/181 |
| 4,809,421 A | | 3/1989 | Justice |
| 4,836,062 A | | 6/1989 | LaTorre |
| 4,997,327 A | * | 3/1991 | Cira .................. F16B 13/0808 |
| | | | 411/340 |
| 5,651,649 A | | 7/1997 | Sadri et al. |
| 5,702,218 A | * | 12/1997 | Onofrio ................ E04B 9/006 |
| | | | 411/341 |
| 6,247,883 B1 | | 6/2001 | Monserratt |
| 6,254,071 B1 | * | 7/2001 | Greenhill ............... F16F 1/025 |
| | | | 267/158 |
| 6,254,323 B1 | | 7/2001 | Junkers |
| 6,367,205 B2 | | 4/2002 | Cornett, Sr. |
| 7,108,568 B2 | | 9/2006 | Jazowski et al. |
| 7,137,329 B1 | | 11/2006 | Moser |
| 7,204,667 B2 | | 4/2007 | Uno et al. |
| 7,373,709 B2 | | 5/2008 | Fernando et al. |
| 7,887,274 B2 | | 2/2011 | Catlin |
| 7,905,069 B1 | | 3/2011 | Lockwood |
| 8,206,071 B1 | | 6/2012 | Johnson |
| 8,517,650 B2 | | 8/2013 | Niklewicz et al. |
| 8,555,481 B2 | | 10/2013 | Porter et al. |
| 9,145,908 B2 | | 9/2015 | Gill et al. |
| 9,200,659 B1 | * | 12/2015 | LaFurge, Jr. ......... F16B 19/109 |
| 9,322,423 B2 | * | 4/2016 | Graf ........................ G01F 1/58 |
| 10,730,169 B2 | * | 8/2020 | Strange et al. ........ F16B 31/021 |
| 2005/0168855 A1 | * | 8/2005 | Fanelli et al. ......... B60R 1/0617 |
| | | | 359/881 |
| 2009/0200721 A1 | * | 8/2009 | Kobelev et al. ..... B60G 15/062 |
| | | | 267/195 |
| 2013/0156525 A1 | | 6/2013 | Gill et al. |
| 2013/0234380 A1 | * | 9/2013 | Kyoung et al. ........ B60G 11/15 |
| | | | 267/292 |

OTHER PUBLICATIONS

Answer of Defendant, Acme Operations Pty. Ltd. - Allfasteners USA, LLC vs. Acme Operations Pty., Ltd. d/b/a Ajax Engineered Fasteners, et al., US District Court Central District California Case No. 2:18-cv-06929 - Answer Filed Nov. 8, 2018.
Answer of Defendant, Ira Svendsgaard and Associates, Inc. - Allfasteners USA, LLC vs. Acme Operations Pty., Ltd. d/b/a Ajax Engineered Fasteners, et al., US District Court Central District California Case No. 2:18-cv-06929 - Answer Filed Nov. 8, 2018.
Complaint dated Jul. 9, 2015 in Case No. 1:15-cv-1366, Northern District Ohio.
Complaint for Patent Infringement - Allfasteners USA, LLC vs. Acme Operations Pty., Ltd. d/b/a Ajax Engineered Fasteners, et al., US District Court Central District California Case No. 2:18-cv-06929 - Filed Aug. 13, 2018.
Counterclaim of Defendant, Acme Operations Pty. Ltd. - Allfasteners USA, LLC vs. Acme Operations Pty., Ltd. d/b/a Ajax Engineered Fasteners, et al., US District Court Central District California Case No. 2:18-cv-06929 - Counterclaim Filed Nov. 8, 2018.
Counterclaim of Ira Svendsgaard and Associates, Inc.. - Allfasteners USA, LLC vs. Acme Operations Pty., Ltd. d/b/a Ajax Engineered Fasteners, et al., US District Court Central District California Case No. 2:18-cv-06929 - Counterclaim Filed Nov. 8, 2018.
Joint Invalidity Contentions of Defendants in Case no. 2:18-cv-06929, Central District California.
Robert W. McIntyre; Case 2:18-cv-06929-JAK-RAO; Document 130; Filed Jan. 6, 2020; entitled Defendant IRA Svendsgaard & Associates, Final Invalidity Contentions.

* cited by examiner

BLIND BOLT WITH COLLAPSIBLE SHEAR SLEEVE ASSEMBLY

FIELD

The present invention relates to blind bolts that are used in applications where the bolt must be placed in a hole and the distal end of the hole is not accessible. In particular, the invention relates to blind bolts with high shear resistance.

BACKGROUND

Blind bolts are used in applications where the distal end of the far end of a hole is not accessible. The blind bolt is typically inserted into the hole and an anchor is expanded beyond the far end of the hole so as to secure the blind bolt within the hole. Then the blind bolt is tightened. In some applications, the blind bolt may be subjected to shear forces and it is desirable to place a sheer sleeve on the blind bolt. An example of such bolt is shown in U.S. Pat. 10,018,212 in which a shear sleeve is positioned and held by a spring so as to place the sheer sleeve in a position that crosses an interface that is likely to create shear forces on the bolt. While this type of bolt performs well in most applications, there may be applications in which alternative configurations are preferred.

SUMMARY OF INVENTION

In accordance with the present invention, a blind bolt is provided for extending through a hole which extends through a first and second member. The blind bolt includes a shaft having a length greater than the length of the hole and has a distal end and a proximate end with threads formed on the shaft adjacent the proximate end. An anchor is disposed on the distal end of the shaft, and the anchor has expanded and contracted configurations. When the shaft is disposed in the hole, the anchor is positioned beyond the distal end of the hole, and the anchor is expanded and positioned engaging a surface of the second member thereby holding the shaft in the hole preventing the shaft from moving in a direction towards the proximate end. A shear sleeve is disposed on the blind bolt proximate to the distal end of the shaft and has a length sufficient to extend across the second member, across the interface between the first and second members and partially across the first member. A nut is threaded on the threads of the shaft, and a collapsible cylinder is disposed on the blind bolt shaft between the sheer sleeve and nut. A washer may be disposed between the nut and the collapsible cylinder, but the collapsible cylinder is still between the sheer sleeve and the nut. The collapsible cylinder and the sheer sleeve have a combined length such that when the anchor is in the expanded configuration and the sheer sleeve and the collapsible cylinder are positioned on the shaft within the hole, the collapsible cylinder pushes the sheer sleeve to a position extending across the interface between the first and second members as the nut is tightened on the shaft.

In one embodiment, the collapsible cylinder is made of a malleable material. Examples of such material would be sheet metal or plastic (polymers). The collapsible cylinder may be a sleeve made of the malleable material that is weakened at a plurality of positions along its length to control deformation in response to a force parallel with it's axis. Thus, as the nut is tightened, the collapsible cylinder pushes the sheer sleeve. The sheer sleeve is first moved into position proximate the anchor and then the collapsible cylinder is deformed in a desired pattern by the force of the tightening nut. For example, the collapsible cylinder may be weakened by a wave pattern along its length so that the collapsible cylinder is deformed in a desired wave pattern. Alternatively, the collapsible cylinder may be weakened at a plurality of positions along its length to control the deformation process. For example, the collapsible cylinder may include a plurality of circumferential score lines that are spaced apart along the length of at least a portion of the collapsible cylinder.

In one embodiment, the collapsible cylinder may be a telescoping sleeve comprising an inner sleeve positioned within an outer sleeve and configured to resistively slide within the outer sleeve. As the nut is tightened and the collapsible cylinder is pushed towards the sheer sleeve, the sheer sleeve is first moved into position proximate the anchor and then the inner sleeve resistively slides within the outer sleeve. In one example, the inner sleeve is configured to friction fit within the outer sleeve such that the friction between the outer and inner sleeves will resist sliding, but will allow sliding, of the inner sleeve within the outer sleeve.

In yet another embodiment, projections may be formed on at least one of the inner sleeve and the outer sleeve. The projections may be configured to friction fit between the outer sleeve and the inner sleeve such that the projections will resist sliding, but allow sliding, of the inner sleeve within the outer sleeve.

In yet another embodiment, projections are formed on both the inner sleeve and the outer sleeve, and the projections on one sleeve engage projections on the other sleeve to produce the resistance against sliding. The projections may be formed in patterns such that the resistance against sliding changes as the inner sleeve moves within the outer sleeve. Thus, the resistance may progressively increase or progressively decrease as the inner sleeve slides within the outer sleeve. Also, the resistance may increase and then decrease, or vice versa, as the inner sleeve moves within the outer sleeve.

In yet another embodiment the collapsible sleeve is configured to fit within and resistively slide within the sheer sleeve. For example, the collapsible sleeve may be configured to friction fit within the sheer sleeve such that the friction force between the two sleeves resists movement. The friction force is sufficiently great to prevent telescoping movement of the two sleeves as the sheer sleeve is being moved into position across the interface, but is sufficiently small to allow telescoping movement of the two sleeves once the sheer sleeve has been moved into position across the interface and the nut continues to be tightened.

In one embodiment, the collapsible sleeve within the sheer sleeve has a length greater than the hole. When the sheer sleeve has been properly positioned, tightening the nut will drive the inner sleeve to the end of the sheer sleeve where it engages the anchor. Then, continued tightening of the nut will collapse or deform the sheer sleeve in a space that is formed between the end of the sheer sleeve and the nut. To control the deformation of the inner sleeve, at least a portion of the inner sleeve may be weakened. For example, one end of the collapsible sleeve may be weakened such that it deforms in a predictable manner as the nut is fully tightened. The weakened end of the collapsible sleeve may be created by score lines formed circumferentially on the collapsible sleeve. Alternatively, the weakened end of the collapsible sleeve may be created by curves or waves formed along the length of the weakened end such that the collapsible sleeve will collapse in a wave pattern.

In a preferred embodiment, the anchor is formed by a blind bolt head on the distal end of the shaft, and the head has a diameter that is smaller than the diameter of the hole. A foldable washer is disposed on the distal end of the threaded shaft between the head and the surface of the second member. The folded washer has a folded configuration with a diameter smaller than the diameter of the hole and is configured such that it may pass through the hole. It also has an unfolded configuration with a diameter greater than the diameter of the hole and it is configured such that it may not pass through the hole.

BRIEF DESCRIPTION OF THE DRAWINGS

The present invention may best be understood by reference to representative embodiments shown in the attached figures in which:

FIG. 3 is a somewhat diagrammatic, highly exaggerated, cross-sectional view of a collapsible cylinder 24a showing that the collapsible cylinder 24a may be weakened by sharply bending the side walls of the cylinder 24a and that the bends in the side walls may vary along the length of the cylinder 24a;

DETAILED DESCRIPTION OF THE DRAWINGS

The present invention is a blind bolt similar to the blind bolt shown in U.S. Pat. 10,018,212. The difference is that the spring shown in U.S. Pat. 10,018,212 is replaced by a collapsible cylinder 24.

Figure 1:
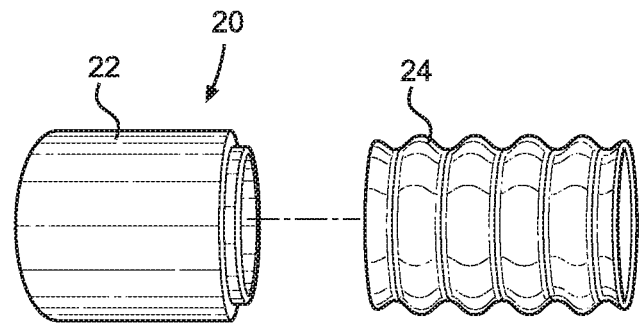
FIG. 1 is a perspective exploded view of a shear sleeve aligned with a collapsible cylinder in the form of the wavy sleeve configured to position the sheer sleeve in proper alignment with an interface between two plates or members.
Figure 4:
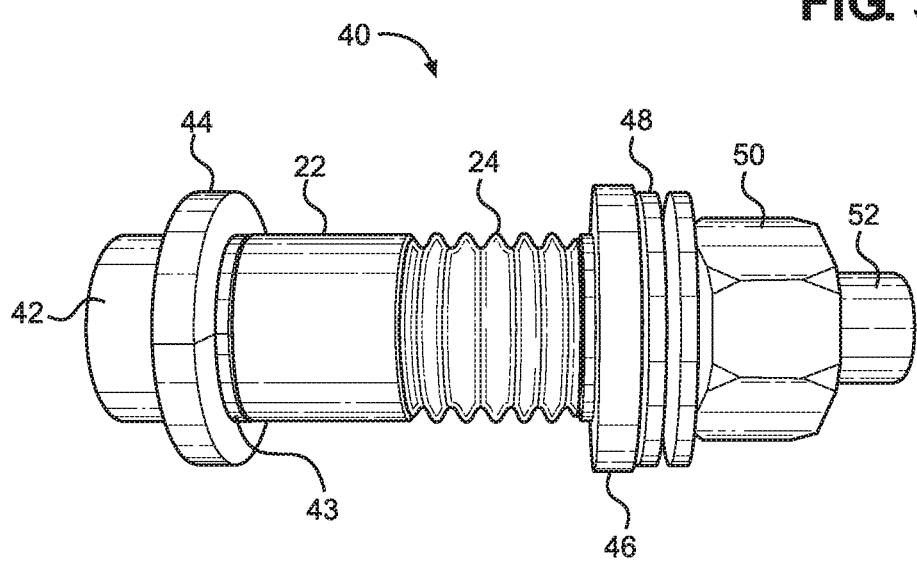
FIG. 4 is a perspective view showing the sheer sleeve 22 and the collapsible sleeve 24 mounted on a blind bolt.

Referring to FIG. 1, a shear sleeve subassembly 20 is shown which includes a shear sleeve 22 and a collapsible cylinder 24. As shown in FIG. 4, the shear sleeve subassembly 20 is positioned on a blind bolt 40 as shown in FIG. 4. The blind bolt 40 is shown in an assembled configuration in which the bolt parts are arranged in the order that would be used when the bolt is in use holding two or more parts together. Referring to the left side of the bolt 40, a head 42 is formed on the distal end of bolt 40, and a foldable washer 44 is shown in an unfolded configuration positioned adjacent to the head 42 with a shoulder 43 extending from the foldable washer 44 toward the shear sleeve 22, which is also mounted on the bolt. The collapsible cylinder 24 is positioned between the shear sleeve 22 and a washer 46, and another washer 48 is disposed on the outside of the washer 46. A nut 50 is secured on the threaded shaft 41 (see FIG. 5) of bolt 40 outside of the washer 48 and a tip 52 is shown on the end of the bolt 40. The foldable washer 44 functions as an anchor disposed on the distal end of the shaft 41. In the unfolded configuration the foldable washer 44 is an example of an anchor in an expanded configuration that engages a surface of the second member 60 and holds the shaft 41 in the hole 66 preventing the shaft 41 from moving in a direction towards its proximate end. In the folded configuration, the folded washer is an example of an anchor in a contracted configuration that may pass through the hole 66.

Figure 5:
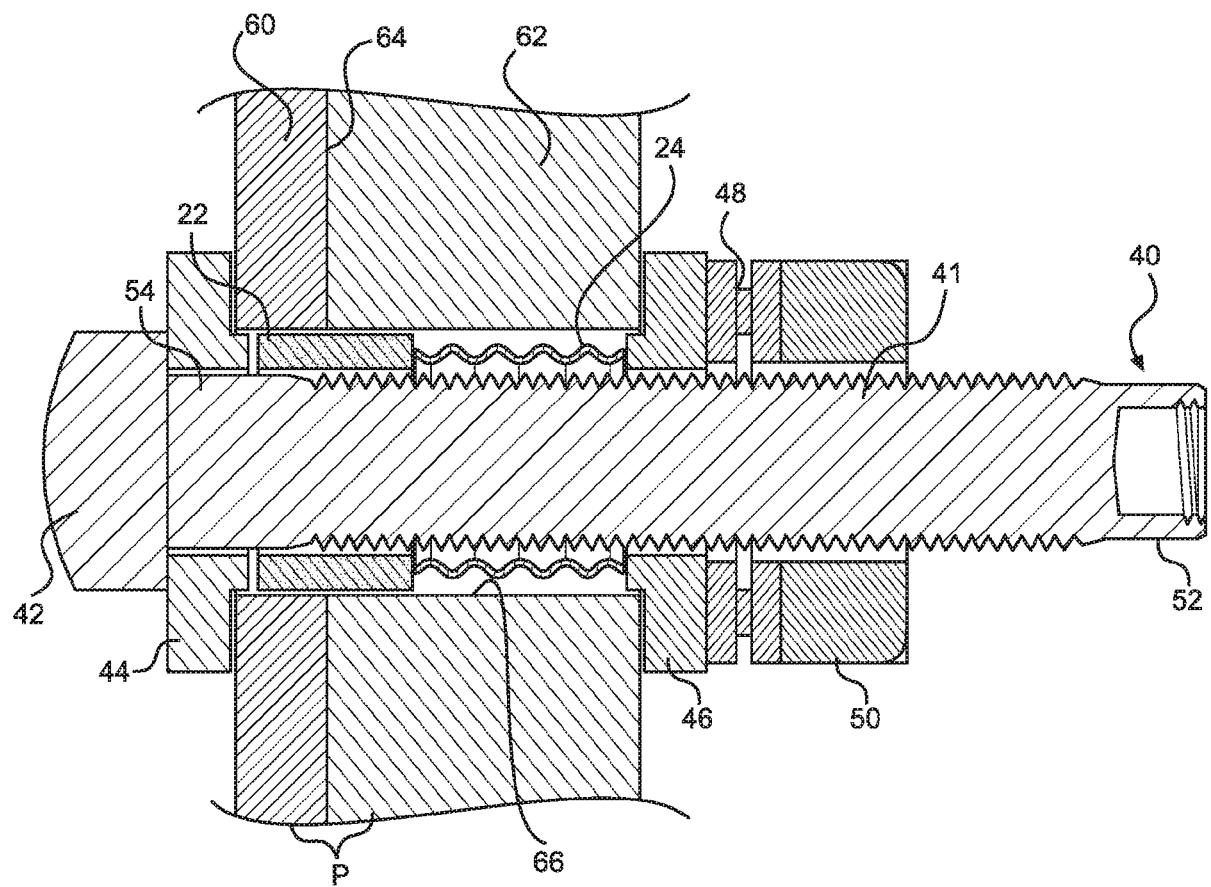
FIG. 5 is a cross-sectional view showing the sheer sleeve 22 and the collapsible sleeve 24 mounted on a blind bolt that is installed in a hole 66 through two members 60 and 62 with the sheer sleeve 22 disposed across an interface 64.

A cross-sectional view of the bolt 40 is shown in FIG. 5 securing together plates 60 and 62, which may be metal plates. The head 42 of the bolt 40 is pressing against the washer 44 which is pressing against the plate 60 and securing it to the plate 62. The shear sleeve 22 is positioned on the bolt 40 spanning the interface 64 between the plates 60 and 62. If the plates 60 and 62 experience forces that would cause them to move, one with respect to the other in a sliding direction, the shear sleeve 22 will experience a shear force at the interface 64 and will resist that shear force. The collapsible cylinder 24 is positioned adjacent to the shear sleeve 22 and holds the sleeve 22 in proper position spanning the interface 64. Another washer 46 is positioned on the outside of the cylinder 24 and a squirter washer 48 is positioned outside of washer 46. The nut is secured on the bolt 40 outside of the washer 48.

Referring to FIGS. 4 and 5, the overall length of the shear sleeve subassembly 20, which includes at least the shear sleeve 22 plus the collapsible cylinder 24, is greater than the width of the two plates 60 and 62. Thus, the shear sleeve subassembly 20 is also greater in length than the hole 66 extending through the plate 60 and 62. When the subassembly 20 is first placed on the bolt within the hole 66, it will engage in the washer 44 and extend from the left end of the hole 66 and out of the right end of the hole 66. As the nut 50 is rotated and threaded onto the bolt 40, it engages the washers 48 and 46 and, through those two washers, the nut also forces the collapsible cylinder 24 inwardly toward the head 42. As the nut continues to be tightened, the nut will move the collapsible cylinder 24 towards the washer 44 and eventually will cause it to engage the washer 44. It will also pull the head 42 back towards the right and eventually the head 42 will clamp the washer 44 against the plate 60. As the nut continues to be tightened, the collapsible cylinder 24 will begin to collapse or crush until the washer 46 engages the outside surface of the plate 62. When the nut 50 is fully tightened, the collapsible cylinder 24 will no longer be compressed or collapsing. Instead, it will be a rigid cylinder 24 holding the shear sleeve 22 in place across the interface 64.

As used herein, the word "engage" is used in its normal mechanical sense. It does not require that two parts are actually touching. One part may engage another part through an intermediary part. For example, the nut 50 is not touching the collapsible cylinder 24, but mechanically it engages the collapsible cylinder 24 through the two washers 46 and 48. Likewise, parts that are separated by a film of oil, grease or solid lubricant are not technically touching or contacting each other, but they are still engaging mechanically. In FIG. 5, the shear sleeve 22 is engaging the foldable washer 44 in a direct touching sense, and the collapsible cylinder 24 is also engaging the foldable washer 44 through the shear sleeve.

Figure 2:
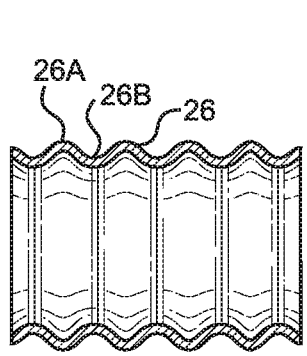
FIG. 2 is a cross-sectional view of collapsible cylinder 24 showing the sinusoidal wave configuration of the side walls of the cylinder 24.

Referring again to FIGS. 1 and 2, one embodiment of the collapsible cylinder 24 is shown. In this embodiment, the cylinder 24 is constructed of wavy sheet metal that is malleable. FIG. 2 represents a cross sectional view taken longitudinally through the cylinder 24 through a diameter of the cylinder to show the profile of the wavy walls of cylinder 24. As shown in FIG. 2, the walls 26 of the cylinder 24 have a sinusoidal wave shape in the longitudinal direction along the length of the cylinder 24, and as best shown in FIG. 1, the cylinder 24 has a cylindrical cross-section across its width in a direction perpendicular to the longitudinal direction of the cylinder 24. In this embodiment the wall width is substantially uniform throughout the cylinder 24 and the bend in the wall 26 is maximized at the peaks 26a and valleys 26b of the wall 26. Thus, the peaks and valleys of the wall 26 are weaker and the cylinder 24 will crush uniformly bending at the peaks 26a and valleys 26b as the cylinder 24 is crushed by the nut 50.

Figure 3:
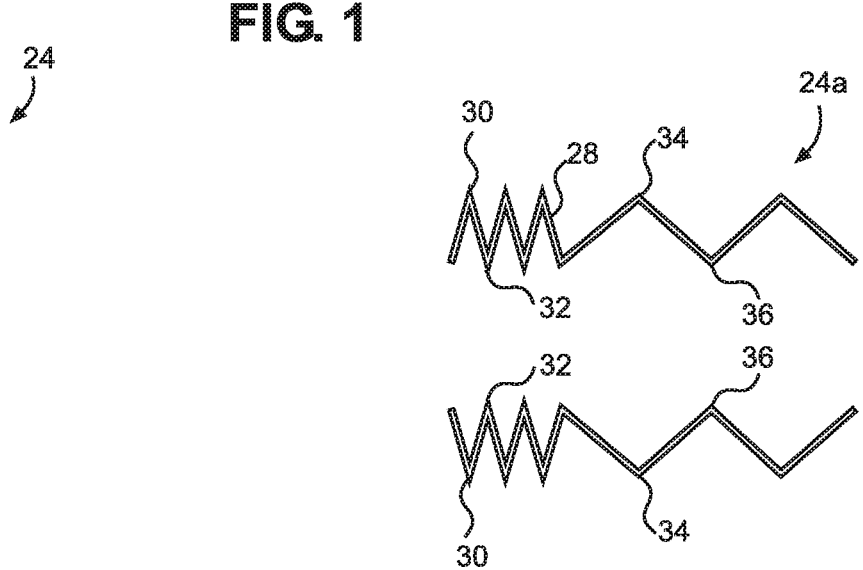

Referring to FIG. 3, a diagrammatical illustration of a cylinder 24a is shown in FIG. 3 that is a slice taken longitudinally through the cylinder to reveal the wall profile. FIG. 3 is dramatically exaggerated to show that the wavy structure of the cylinder 24a need not be sinusoidal and need not be uniform throughout the cylinder 24a. In FIG. 3, the wavy structure of the cylinder wall 28 has a higher frequency on the left side as compared to the right side of the cylinder 24a. In other words, the peaks 30 and valleys 32 are closer together on the left side of the cylinder 24a than the peaks 34 and valleys 36 on the right side of the cylinder 24a. Even though the peaks and valleys are shown as sharp points and the wall segments are shown as linear or straight, it will be understood that typically the walls will be slightly curved and the peaks and valleys will not be sharply pointed. In this embodiment, since the peaks 30 and valleys 32 are more sharply bent, the original compression will begin by malleably bending the peaks and valleys 30 and 32 because they are the weakest. After the left end of the cylinder is fully crushed, the right end will begin to bend about the peaks and valleys 34 and 36. By this exaggerated illustration, it is intended to illustrate that the cylinder 24 may be constructed to crush and deform in a predictable manner with one or more sections of the cylinder being weaker so that the cylinder will crush in sections and will require different forces to accomplish the crushing of the cylinder 24a.

In all embodiments, the collapsible cylinder 24 is designed to collapse in a manner such that it will not jam within the hole 66 as shown in FIG. 5. When the cylinder 24 is first placed in the hole 24, it will be designed to have ample spacing between the cylinder 24 and the bolt 40 and between the cylinder 24 and the interior walls of the hole 66. As the cylinder 24 is crushed or collapsed, the spacing between the cylinder 24 and the hole 66 and the bolt 40 may decrease, but the spacing will always be sufficient to avoid jamming. In other words, the spacing will be sufficient to allow the cylinder to be fully crushed as shown in FIG. 5.

Figure 6:
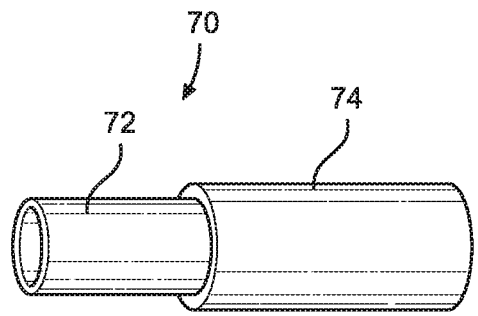
FIG. 6 is a perspective view of a collapsible cylinder 70 constructed from an inner sleeve 72 mounted in a telescoping fashion within an outer sleeve 74.
Figure 7:
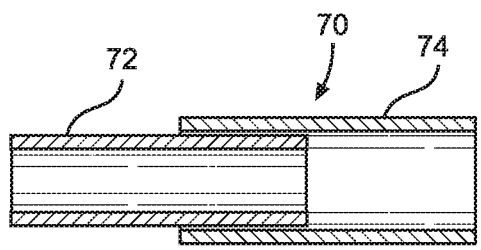
FIG. 7 is a cross-sectional view of the collapsible cylinder 70.

Referring now to FIG. 6, a perspective view of a telescoping cylinder 70 is shown which includes an interior cylinder 72 and an exterior cylinder 74. As discussed below in reference to FIGS. 11 and 12, the exterior cylinder may be the shear sleeve 22. A cross sectional view of the cylinder 70 is shown in FIG. 7 to reveal the wall profile. Again, this cross-sectional view is taken longitudinally through the cylinder 70 along a diameter of the cylinder. In this embodiment the interior cylinder 72 is dimensioned to friction fit within the exterior cylinder 74 such that it will slide against friction within the exterior cylinder 74. The telescoping cylinder 70 may be dimensioned to fit on the bolt 40 in the manner previously described with respect to cylinder 24. As the nut 50 is tightened, the interior cylinder 72 will slide into the exterior cylinder 74 and the pressure generated by the rotating nut 50 will be sufficient to force the cylinders together and overcome the friction between cylinder 72 and 74. A lubricant such as oil, grease or a solid lubricant can be used to make the friction between the two cylinders 72 and 74 more predictable and controllable. As used herein, the term collapsible cylinder encompasses a telescoping cylinder, and telescoping is a form of "collapsing". Thus, the term "collapsing" does not necessarily require deformation, but deformation is also a form of collapsing.

Figure 8A:
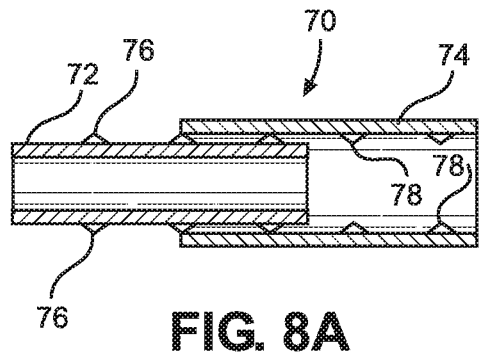
FIG. 8a is a cross-sectional view of a collapsible cylinder 70 with projections on both cylinders for controlling the resistive movement between the two cylinders.

In an alternate embodiment shown in FIG. 8a, which is a cross sectional view similar to FIG. 7, the exterior surface of the interior cylinder 72 may include protrusions 76 and likewise the interior surface of the exterior cylinder 74 may include protrusions 78. These protrusions 76 and 78 are designed to engage as the cylinders 72 and 74 are telescoped to gather. The engaging protrusions resist the movement, but are bendable or malleable such that they will yield and allow the cylinders to telescope together. Thus, the protrusions 76 and 78 will control the force required to telescope the cylinders 72 and 74 together. In one embodiment, the protrusions 76 may be constructed to maintain their shape as the cylinders 72 and 74 are telescoped together, while the protrusions 78 are designed to bend out of the way as protrusions 76 engage them. In addition, the protrusions 78 may be designed with different strengths along the length of the cylinder 74 so that the force required to collapse the cylinders 72 and 74 will change as the cylinder is telescoped together. So, for example, the protrusions 78 may be designed to require a strong force at the beginning of the collapse, but transition to require a lesser force during the middle of the collapse, and finally to require the strongest force at the end of the collapse of the telescoping cylinder 70.

Figure 8B:
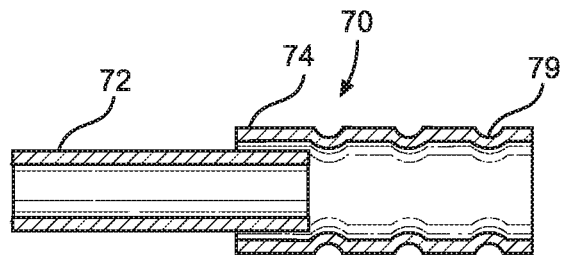
FIG. 8b is a cross-sectional view of a collapsible cylinder 70 in which the outer cylinder 74 includes indentations 79 that engage the inner cylinder 72 and control the resistive movement between the two cylinders.

Another embodiment is shown in FIG. 8b, which is a cross sectional view like FIG. 7, in which the exterior cylinder 74 includes inwardly extending indentions 79, and the interior cylinder 72 has a smooth exterior wall. The indentations 79 may be distributed evenly along the right side of the cylinder 74 of FIG. 8b to provide a consistent increasing resistance to collapsing telescoping movement. Or the indentions may be distributed non-uniformly and may have different sizes to create a non-uniform resistance to telescoping collapsing movement of the cylinders 72 and 74 of FIG. 8b. When the cylinders 72 and 74 of FIG. 8b are initially telescoped together, the movement is resisted only by the friction of two smooth walls sliding against one another. Later, the cylinder 72 will begin to engage the indentions, and the resistance to telescoping collapsing movement increases. To continue movement, the indentions 79 are deformed upwardly and/or the cylinder 72 is deformed inwardly, and the energy required to create the deformations resists the collapsing telescoping motion of the two cylinders 72 and 74 of FIG. 8b. The cylinders 24 (FIG. 2) and 70 (FIGS. 6 - 8b) may be provided as separate parts, or the cylinders may be attached to the sleeve 22 (FIG. 4 and FIG. 4) by appropriate mechanical fasteners, adhesives or other forms of bonding, such as welding. Likewise, the cylinders 24 and 70 may be provided as separate parts and separated from the shear sleeve 22, such as by other parts or spacers.

Figure 10:
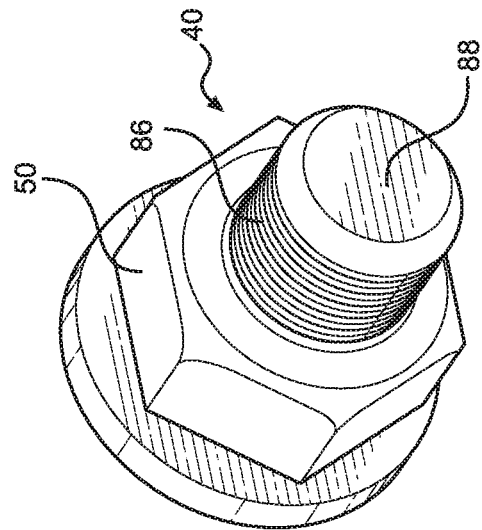
FIG. 10 is a perspective view showing the proximate end of the blind bolt with the sheer tip 84 are removed.
Figure 9:
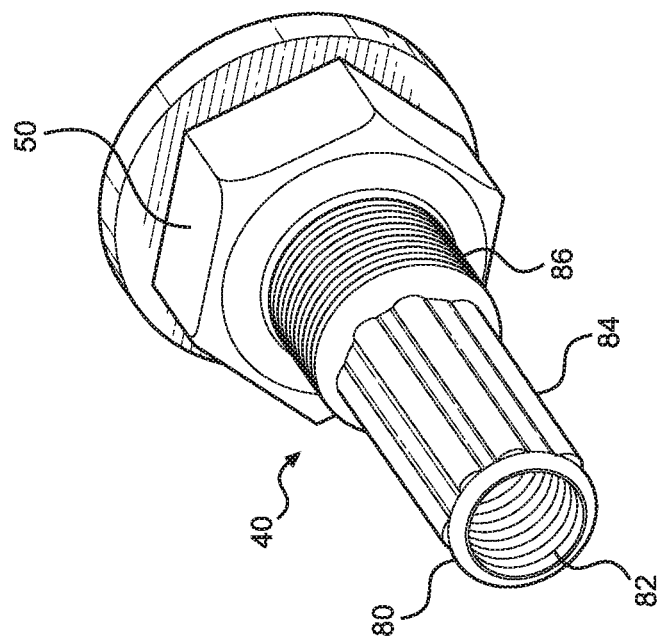
FIG. 9 shows the proximate end of a blind bolt utilizing a sheer tip 84.

Referring to FIG. 9, a different tip 80 is shown which may be substituted for the tip 52 shown in FIG. 5. In this tip, internal threads 82 are provided for securing the tip to a tool and allowing the blind bold to be inserted into a hole. After the blind bolt is inserted as desired, the nut 50 is secured onto the bolt 40 on the threads 86 as previously described. The tip 80 also includes exterior splines 84. Once the bolt 50 has been hand tightened, a tool is used to engage the splines 84 and the nut 50, and a torque is applied between the tip 80 and the nut 50. In other words, the tip 80 is used to hold and immobilize the bolt 40 while the nut 50 is being tightened on the bolt 40. As the nut 50 becomes tighter, increasing force is required to rotate the nut 50 relative to the tip 80. Eventually, the torque between the tip 80 and the bolt 50 is sufficient to break or shear the tip 80 away from the bolt 40. The tip 80 includes a shear zone designed to break at a specific torque. Thus, when the tip 80 is broken off of the bolt 40, it is known that the nut 50 has been torqued sufficiently. FIG. 10 illustrates the bolt 40 after the tip 80 has been sheared off. In FIG. 10 the shear zone 88 is shown illustrating the point at which the tip 80 was formerly attached to the bolt 40.

Figure 11:
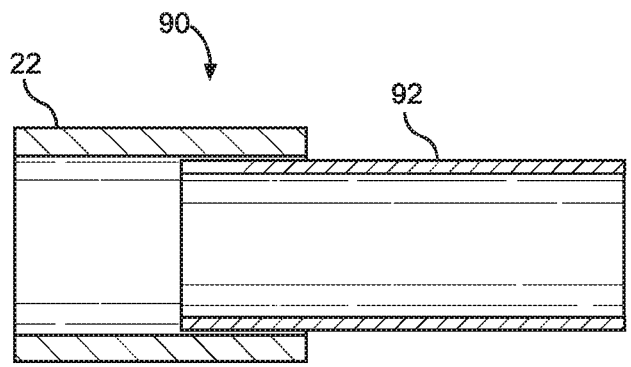
FIG. 11 is a cross-sectional view of a collapsible cylinder 90 in which the sheer sleeve 22 forms the outer sleeve and an inner sleeve 92 is mounted within the sheer sleeve 22 for telescoping motion therein.

Referring now to FIG. 11 yet another embodiment is shown. In this embodiment, a collapsible cylinder 92 is fitted within the shear sleeve 22. This embodiment may work in a manner similar to the embodiment shown in FIGS. 6 and 7, except that the shear sleeve 22 has been substituted for the sleeve 74 shown in FIG. 6. Preferably the sleeve 92 is constructed of a durable plastic such as LDPE, but other similar plastics could be used. Likewise, the sleeve 92 may be formed of a durable malleable metal. The friction fit between the sleeve 92 and the shear sleeve 22 is designed and dimensioned to provide sufficient friction such that the sleeve 92 will initially force the shear sleeve 22 into proper position when the blind bolt is installed, and then the sleeve 92 will slide within the shear sleeve 22 after the shear sleeve 22 is properly positioned. The friction between shear sleeve 22 and a collapsible cylinder 92 may be controlled by the use of oil, grease or solid lubricants between the two sleeves.

Figure 12:
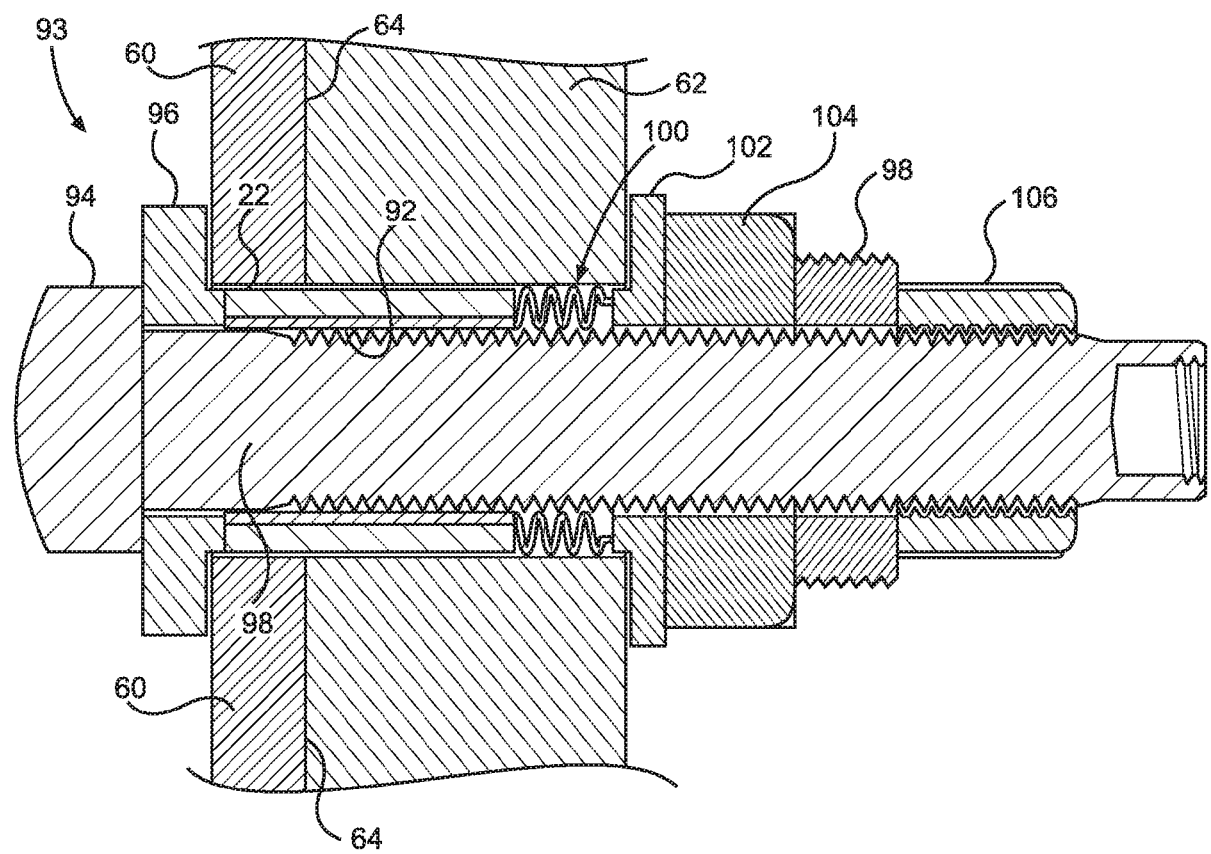
FIG. 12 is a cross-sectional view showing the sheer sleeve 22 and the collapsible sleeve 92 mounted on a blind bolt that is installed in a hole 66 through two members 60 and 62.

The operation of this embodiment is best understood by reference to FIG. 12 which shows a blind bolt 93 in a configuration as it would appear after being installed in a hole through two plates 60 and 62. FIG. 12 substantially similar to FIG. 5 except that the sleeve 92 is shown in position on the bolt shaft 98 in its final mounted configuration. The blind bolt 93 includes a head 94 and a anchor 96 with a shaft 98 extending from the head 94 through the anchor 96. The shear sleeve 22 is mounted around the shaft 98 and the sleeve 92 has been driven entirely through the shear sleeve 22 such that it is engaging the anchor 96 as well. In this embodiment, the sleeve 98 has been designed with a dimension that is greater than the length of the hole in which the bolt 93 is mounted. Thus, the sleeve 92 moves within the shear sleeve 22 in a telescoping fashion until it reaches the foldable washer 96. At that point, the sleeve 92 begins to deform or crush in the crush area 100 between the shear sleeve 22 and a washer 102. The movement of the sleeve 92 and the crushing of the sleeve 92 was accomplished by the force transmitted by the nut 104 through the washer 102 as it was threaded onto the bolt shaft 98 and thereby pushed the washer 102 towards the head of the bolt 94. The sleeve 92 fits snugly within the gap between the shear sleeve 22 and the bolt shaft 98, such that the shear sleeve 22 and the shaft 98 reinforce and support the sleeve 92 and prevents it from significantly crushing or deforming in the gap. Thus, the sleeve 92 crushes essentially only within the crush area, except for minor deformations that may occur in the gap. In addition, the end of the sleeve 92 may be weakened on the end nearest the nut 104 along a length of the sleeve 92 that extends out of the shear sleeve 22 when the sleeve 92 is fully inserted. For example, circular scored may be formed around the circumference of the sleeve 92 at intervals along the sleeve. The scores will cause the sleeve to bend around the scores and deform in a controlled manner. Alternatively, a wave pattern may be formed in the sleeve 92 to cause it to deform and crush in the pattern shown in FIG. 12.

This embodiment utilizes both the telescoping features and the crushing features that were described in the above embodiments. So, for example, the friction fit between the shear sleeve 22 and the collapsible cylinder 92 may be designed to provide any level of resistance, including variable levels of resistance as the collapsible cylinder 92 moves through the shear sleeve 22. Likewise, the crushable area 100 of the sleeve 92 may be designed with any of the crushable features described above. For example, in the displayed embodiment of FIG. 12 the sleeve 92 has been designed to crush uniformly in a wave configuration. The wave configuration of the sleeve 92 in the crushable area 100 will at least partially engage the end of the shear sleeve 22 and prevent it from moving out of place. Likewise, the friction force between the shear sleeve 22 in the collapsible cylinder 92 will also operate to prevent movement of the shear sleeve 22 once it has been set in proper position across the interface 64 between the two plates 60 and 62.

As will be appreciated from the above discussion, a collapsible cylinder, such as cylinder 24, 70 or 92 enables different force characteristics as compared to a spring, and a collapsible cylinder may be preferable in some applications. For example, a collapsible cylinder may be designed to crush or telescope at a relatively uniform force throughout its length. Thus, it provides a consistent force on the shear sleeve 22 and a consistent resistance to the tightening of the nut 50. Alternatively, the collapsible cylinder could be designed to provide a variable force and a variable resistance to the tightening of the nut 50. The collapsible cylinder could collapse easily at the beginning and then provide more resistance at the end of the overall collapse of the cylinder. Thus, the nut 50 could be rotated quickly and easily at the beginning, but at the end it would apply the desired amount of increased force against the shear sleeve 22. In other situations, it may be desirable to provide strong resistance at the beginning and at the end of the collapse, but provide light resistance during the middle of the collapse. The variability of the forces may be accomplished by the use of both crushing and telescoping features if desired, as illustrated by collapsible cylinder 92. But, the cylinder 92 could also provide substantially linear resistance if desired.

The above embodiments are provided as examples of the invention and are not intended to limit the invention to the specific structures shown. The invention is defined by the Claims, and it will be appreciated that the invention is capable of numerous rearrangements, modifications and substitutions of parts without departing from the spirit of the invention.

The invention claimed is:

1. A blind bolt for extending through a hole, the hole having a diameter, a length, a proximate end and a distal end, the hole extending through a first member and a second member with a surface on the second member adjacent the distal end of the hole, and with an interface between the first member and the second member, the blind bolt comprising:
a shaft having a length greater than the length of the hole and having a distal end and a proximate end with threads formed on the blind bolt shaft adjacent the proximate end;
an anchor disposed on the distal end of the shaft, the anchor having expanded and contracted configurations, the anchor in the expanded configuration engaging the surface of the second member, holding the shaft in the hole and preventing the shaft from moving in a direction towards the proximate end;
a shear sleeve disposed on the blind bolt shaft proximate the distal end of the blind bolt shaft and having a length dimension sufficient to extend across the second member, across the interface between the first and second members, and partially across the first member;
a nut threaded on the threads of the shaft; and
a collapsible cylinder disposed on the shaft between the shear sleeve and the nut,
the collapsible cylinder and the shear sleeve having a combined length such that when the anchor is in the expanded configuration, the shear sleeve and the collapsible cylinder are positioned on the shaft within the hole, and the nut is fully tightened on the threads of the shaft, the collapsible cylinder has pushed the shear sleeve to a position extending across the interface between the first member and the second member and the collapsible cylinder will be a rigid cylinder that is no longer compressed.

2. The blind bolt of claim 1 wherein the collapsible cylinder is a sleeve made of malleable material.

3. The blind bolt of claim 1 wherein the collapsible cylinder is a sleeve made of malleable material that is weakened at a plurality of positions along its length to control deformation in response to a force parallel with its axis so that as the nut is tightened and the collapsible cylinder pushes the shear sleeve, the shear sleeve is first moved into position proximate the anchor and then the collapsible cylinder is deformed in a desired pattern.

4. The blind bolt of claim 1 wherein the collapsible cylinder is a sleeve made of malleable material that is weakened by a wave pattern along its length to control deformation in response to a force parallel with its axis so that as the nut is tightened and the collapsible cylinder is forced against the shear sleeve, the shear sleeve is first moved into position proximate the anchor and then the collapsible cylinder is deformed in a desired wave pattern.

5. The blind bolt of claim 1 wherein the collapsible cylinder is a sleeve made of malleable material that is weakened at a plurality of positions along its length to control deformation in response to a force parallel with its axis so that as the nut is tightened and the collapsible cylinder is forced against the shear sleeve, the shear sleeve is fist moved into position proximate the anchor and then the collapsible cylinder is deformed in a desired pattern.

6. The blind bolt of claim 1 wherein the collapsible cylinder is a telescoping sleeve comprising an inner sleeve positioned within an outer sleeve and configured to resistively slide within the outer sleeve, so that as the nut is tightened and the collapsible cylinder is forced against the shear sleeve, the shear sleeve is first moved into position proximate the anchor and then the inner sleeve resistively slides within the outer sleeve.

7. The blind bolt of claim 6 wherein the inner sleeve is configured to friction fit within the outer sleeve such that the friction between the outer and inner sleeves will resist sliding, but allow sliding, of the inner sleeve within the outer sleeve.

8. The blind bolt of claim 6 wherein projections are formed on at least one of the inner sleeve and the outer sleeve, and the projections are configured to friction fit between the outer sleeve and the inner sleeve such that the projections will resist sliding, but allow sliding, of the inner sleeve within the outer sleeve.

9. The blind bolt of claim 6 wherein projections are formed on at least one of the inner sleeve and the outer sleeve, and the projections are configured to resistively slide between the outer sleeve and the inner sleeve such that the projections will resist sliding, but allow sliding, of the inner sleeve within the outer sleeve.

10. The blind bolt of claim 1 wherein the anchor comprises:
a blind bolt head on the distal end of the blind bolt shaft, the blind bolt head having a diameter that is smaller than the diameter of the hole; and
a foldable washer being foldable along a fold line for being disposed on the distal end of the threaded blind bolt shaft between the blind bolt head and the surface on the second member, the anchor being in the contracted configuration when the foldable washer is in a folded configuration with a diameter smaller than the diameter of the hole and configured such that it may pass through the hole and the anchor being in the expanded configuration when the foldable washer is in an unfolded configuration with a diameter greater than the diameter of the hole and configured such that it may not pass through the hole.

11. The blind bolt of claim 1 wherein the collapsible cylinder collapses to a crushed configuration as the collapsible cylinder pushes the shear sleeve to the position extending across the interface between the first member and the second member as the nut is tightened on the shaft.

* * * * *